United States Patent [19]

Schlarb et al.

[11] Patent Number: 5,244,950
[45] Date of Patent: Sep. 14, 1993

[54] AQUEOUS SYNTHETIC RESIN DISPERSIONS

[75] Inventors: Bernhard Schlarb, Ludwigshafen; Gerhard Auchter, Bad Durkheim; Peter Pfoehler, Speyer, all of Fed. Rep. of Germany

[73] Assignee: BASF Aktiengesellschaft, Ludwigshafen, Fed. Rep. of Germany

[21] Appl. No.: 768,764

[22] PCT Filed: Apr. 7, 1990

[86] PCT No.: PCT/EP90/00552
§ 371 Date: Oct. 15, 1991
§ 102(e) Date: Oct. 15, 1991

[87] PCT Pub. No.: WO90/12065
PCT Pub. Date: Oct. 18, 1990

[30] Foreign Application Priority Data

Apr. 12, 1989 [DE] Fed. Rep. of Germany ....... 3911945

[51] Int. Cl.$^5$ ............................ C08K 5/15; C09J 11/06
[52] U.S. Cl. .................................... 524/114; 524/501; 524/506; 524/533; 524/730; 427/207.1
[58] Field of Search ............... 524/114, 730, 501, 533, 524/506; 427/207.1

[56] References Cited

U.S. PATENT DOCUMENTS

| | | | |
|---|---|---|---|
| 4,057,527 | 11/1977 | Columbus | 524/501 |
| 4,077,932 | 3/1978 | Columbus | 524/114 |
| 4,097,643 | 6/1978 | Hasegawa | 428/270 |
| 4,961,967 | 10/1990 | Pladdemann | 524/114 X |

FOREIGN PATENT DOCUMENTS 0214696 3/1987 European Pat. Off. .

OTHER PUBLICATIONS

Patent Abstracts of Japan, Band 13, Nr. 278 (c-611)(3636), Jun. 25, 1989, & JP, A, 175577 (Toyo Ink Mfg Co. Ltd.) Mar. 22, 1989.
Patent Abstracts of Japan, Band 10, Nr. 148 (C-350) (2205), May 29, 1986, & JP, A, 617369 (Toyo Ink Seizo K.K.) Jan. 14, 1986.

*Primary Examiner*—Joseph L. Schofer
*Assistant Examiner*—R. H. Delmendo
*Attorney, Agent, or Firm*—Oblon, Spivak, McClelland, Maier & Neustadt

[57] ABSTRACT

An aqueous synthetic resin dispersion consisting of (A) from 35 to 60% by weight of a synthetic resin prepared by free radical solution polymerization of a monomer mixture A1 and monomer mixture A2, wherein mixture A1 is (a) from 1.5 to 15% by weight of at least one $C_{3-5}$ unsaturated monocarboxylic acid, maleic or itaconic acid or anhydride and half-esters of maleic acid or itaconic acid with a $C_{1-8}$ ankanol or with glycol monoethers, (b) from 65 to 98.5% by weight of at least one $C_{1-10}$ alkyl (meth)acrylate, and optionally at least one $C_{11-20}$ alkyl (meth)acrylate (III), vinyl aromatic monomer (IV), mercaptosilane (V), and copolymerizable monomer (VI), and mixture A2 is (a) from 60 to 100% by weight of at least one monomer II, and optionally at least one monomer III, IV or VI and compound (V), with the proviso that more than 65% by weight of the sum total of A1 and A2 is accounted for by monomers II and an amount of compound V which differs from ) and is incorporated in the copolymer;

(B) from 0.05 to 5% by weight of at least one epoxy group containing silane; and
(C) at least one of ammonia and an organic amine; with the remainder being water and wherein the dispersion contains from 0 to 5% organic solvent.

3 Claims, No Drawings

AQUEOUS SYNTHETIC RESIN DISPERSIONS

The present invention relates to aqueous synthetic resin dispersions consisting of (A) from 35 to 60% by weight of a synthetic resin, obtainable by free radical solution polymerization, carried out spatially separately and/or in succession but spatially at the same point, of from 15 to 70 parts by weight of a monomer mixture A1 and from 30 to 85 parts by weight of a monomer mixture A2, composed of A1: (a) from 1.5 to 15% by weight of one or more monomers comprising $\alpha,\beta$-monoethylenically unsaturated mono- and/or dicarboxylic acids of 3 to 5 carbon atoms, anhydrides of these dicarboxylic acids or half-esters of these dicarboxylic acids with alkanols of 1 to 8 carbon atoms or glycol monoethers (monomers I), (b) from 65 to 98.5% by weight of one or more acrylates and/or methacrylates of $C_1$–$C_{10}$-alkanols (monomers II), (c) from 0 to 10% by weight of one or more acrylates and/or methacrylates of $C_{11}$–$C_{20}$-alkanols (monomers III), (d) from 0 to 20% by weight of one or more vinylaromatic monomers (monomers IV), (e) from 0 to 5% by weight of one or more mercaptosilanes of the general formula I (monomers V)

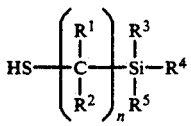  I where n is from 1 to 8, $R^1$ and $R^2$ are each hydrogen and/or $C_1$–$C_{14}$-alkyl and $R^3$, $R^4$ and $R^5$ are each $C_1$–$C_6$-alkyl and/or $C_1$–$C_6$ alkoxy, with the proviso that one or more of the radicals $R^3$ to $R^5$ is alkoxy, and (f) from 0 to 10% by weight of one or more other copolymerizable monomers (monomers VI), and A2: (a) from 60 to 100% by weight of one or more monomers II, (b) from 0 to 10% by weight of one or more monomers III, (c) from 0 to 30% by weight of one or more monomers IV and VI and (d) from 0 to 5% by weight of one or more monomers V, with the proviso that more than 65% by weight of the sum total of A1 and A2 is accounted for by monomers II whose homopolymers have a glass transition temperature of from 0° to −70° C., and an amount of monomers V which differs from. 0, (B) from 0.05 to 5% by weight, based on the synthetic resin A, of one or more silanes of the general formula II

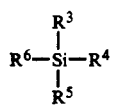  II where $R^6$ is an epoxy-carrying radical, (C) effective amounts of ammonia and/or of an organic amine (D) from 0 to 5% by weight of a nonaqueous solvent, (E) the remainder being water.

The present invention furthermore relates to the preparation of such synthetic resin dispersions and the use of films thereof as contact adhesives for self-adhesive articles.

Aqueous synthetic resin dispersions whose films are suitable as contact adhesives are usually prepared by the method of free radical emulsion polymerization using hydrophilic assistant systems (emulsifiers and/or protective colloids) which, inter alia, ensure a sufficient shelf life of the dispersion. However, these hydrophilic assistants remain in the resulting adhesive film during film formation by the dispersions and have an adverse effect on its water resistance. Inter alia, the adhesive films exhibit blooming on contact with water, which is particularly disadvantageous in the case of self-adhesive transparent films.

DE-A 37 20 860 discloses aqueous polymer dispersions which have a long shelf life and are obtainable by subsequent dispersion of a mixture of two copolymers in water with the addition of ammonia and polyhydrazides, one or both of the copolymers containing a carbonyl compound as copolymerized unit. The films of these dispersions are recommended as contact adhesives having high water resistance. However, the disadvantage of these contact adhesives is that they contain polyhydrazides, which frequently release hydrazine in an undesirable manner under the action of water.

It is an object of the present invention to provide aqueous synthetic resin dispersions which have a long shelf life and whose films do not have the stated disadvantage and in particular are suitable as contact adhesives having high water resistance.

We have found that this object is achieved by the synthetic resin dispersions defined at the outset.

Particularly suitable monomers I are the monocarboxylic acids acrylic and methacrylic acid, the dicarboxylic acids maleic and itaconic acid, the anhydrides of these dicarboxylic acids and half-esters thereof with the alcohols ethanol, isopropanol, n-butanol and glycol mono-n-butyl ether, among which acrylic and methacrylic acid are preferred. The amount of the monomers I in the monomer mixture A1 is advantageously from 5 to 12% by weight. The half-esters of the dicarboxylic acids can also be introduced into the synthetic resins A in an indirect manner by reacting associated anhydride-containing synthetic resins A in solution in an organic solvent at elevated temperatures of from 50° to 100° C. with the corresponding alcohols. Particularly suitable monomers II are methyl acrylate, methyl methacrylate, ethyl acrylate, isopropyl acrylate, n-butyl acrylate, n-butyl methacrylate, isobutyl acrylate, isobutyl methacrylate, tert-butyl acrylate, 2-ethylhexyl acrylate and 2-ethylhexyl methacrylate, n-butyl acrylate and methyl methacrylate being preferred. The amount of the monomers II in A1 is preferably from 80 to 95% by weight. A preferably used building block III is n-dodecyl acrylate. Examples from the series consisting of the vinylaromatic monomers (monomers IV) are styrene, $\alpha$-methylstyrene, vinyltoluenes, tertbutylstyrenes and halostyrenes, such as the chlorostyrenes. The monomers IV are present in A1 preferably in an amount of from 5 to 15% by weight, styrene preferably being used.

The monomers V advantageously present as copolymerized units in A1 are mercaptosilanes I where n is from 2 to 4. $R^1$ and $R^2$ are preferably hydrogen or methyl, while $R^3$ and $R^5$ are advantageously methyl, ethyl, methoxy or ethoxy, and one or more of the radicals $R^3$ to $R^5$ must be methoxy or ethoxy. Particularly preferred mercaptosilanes I for the copolymerization are 3-mercaptopropyltrimethoxysilane, 3-mercaptopropyltriethoxysilane and 3-mercaptopropylmethyldimethoxysilane. The mercaptosilanes I are known and are commercially available. The amount of monomers V preferably used in A1 is from 0.2 to 2% by weight.

Suitable monomers VI include vinyl ethers of lower alkanols, vinyl esters of lower alkanecarboxylic acids, diesters of maleic, fumaric, itaconic, citraconic or mesaconic acid with monohydric alcohols of 1 to 20 carbon atoms which may contain ether and/or thioether groups, monoesters of acrylic or methacrylic acid with simple alkanediols, such as 1,2-ethanediol, 1,3-propanediol or 1,4-butanediol, acrylamide, methacrylamide, acrylonitrile, methacrylonitrile, monoolefins of 3 to 20 carbon atoms, such as propene, 1-butene, 2-butene, isobutene, pentenes or hexenes, and diolefins, such as butadiene and isoprene. However, A1 preferably contains no monomers (VI).

The monomer mixture A2 advantageously contains from 75 to 98% by weight of monomers II, while the amount of the monomers IV and VI in A2 is preferably from 2 to 25% by weight and the monomers V are advantageously present in a part by weight of from 0.2 to 2% by weight. The glass transition temperatures of the homopolymers of the monomers II is stated, for example, in J. Brandrup and E. H. Immergut, Polymer Handbook 1st Ed. J. Wiley, New York 1966 and 2nd Ed. J. Wiley, New York, 1975. Synthetic resins A which are prepared using from 25 to 45 parts by weight of A1 and from 55 to 75 parts by weight of A2 are preferred.

Preferred silanes II are 3-glycidyloxypropyltrimethoxysilane, 2-(3,4-epoxycyclohexyl)-ethyltrimethoxysilane, 2-(3,4-epoxy-4-methylcyclohexyl)-propylmethyldiethoxysilane, 3-glycidyloxypropyldimethylethoxysilane and 3-glycidyloxypropylmethyldiethoxysilane. The novel dispersions preferably contain from 0.1 to 2% by weight, based on the amount of the synthetic resin A used, of the silanes II.

For the preparation of synthetic resins A, the monomer mixtures A1 and A2 may be polymerized spatially separately in solution and then mixed with one another, or polymerized spatially at the same point but in succession. Synthetic resins A which are obtainable by solution polymerization of the monomer mixtures A1 and A2 carried out in succession but spatially at the same point are preferred, the addition of the second monomer mixture being effected when the first monomer mixture used has polymerized to a conversion of 95%, preferably 99%. It is not important whether A1 is polymerized first and then A2 or whether the reverse procedure is adopted. In other respects, the process of free radical solution polymerization for the preparation of the synthetic resins A is carried out in a conventional manner. Preferred synthetic resins A are those which have a K value of from 20 to 50, preferably from 30 to 40, in acetone. The K value is a relative viscosity number which is determined similarly to DIN 53,726, at 25° C. The flow rate of a 3% strength by weight solution of the synthetic resin A in acetone is measured relative to the flow rate of pure acetone. It characterizes the mean degree of polymerization of the polymer, which can be influenced in a known manner by controlling the polymerization conditions. Advantageously, the solution polymerization is carried out in the presence of from 0.3 to 5.0, preferably from 0.5 to 3.0, % by weight, based on the sum of the monomers, of free radical initiators, such as azobiscarboxamides, azobiscarbonitriles or peroxides, such as tertbutyl peroctoate. The polymerization temperature is as a rule from 50 to 150° C., preferably from 80 to 130° C. Polymerization is carried out in the presence or absence of regulators, such as mercaptoethanol, tert-dodecyl mercaptan or diisopropylxanthogen disulfide, which may usually be present in amounts of from 0 to 3% by weight, based on the sum of the monomers.

The amount of solvent used is usually from 20 to 35% by weight, based on the total amount of monomers. Preferably used solvents are those which, owing to their boiling point and/or azeotrope formation with water, can be readily distilled off from the novel dispersions. n-Butanol, isobutanol, propanols, ethanol and toluene are particularly preferred.

For the preparation of the novel synthetic resin dispersions, the resulting organic solutions of the synthetic resins A are usually advantageously converted into a dispersion at elevated temperatures (from 60° to 80° C., preferably 70° C.), by stirring in a concentrated, preferably 25% strength by weight aqueous ammonia solution and then stirring in pure water, and the organic solvent is removed from these dispersions, for example by distillation, to a content of 5% by weight or less, the amount of water removed simultaneously being recycled if required.

In an alternative method of preparation, a similar procedure is followed except that the removal of the organic solvent is carried out before the addition of ammonia.

The amount of ammonia added is such that the pH of the novel dispersions is from 6 to 10, preferably from 7 to 9. Some of the ammonia used for neutralization, ie. from 0 to 25 mol %, can be replaced by organic amines, in particular triethylamine. Preferably, however, only ammonia is used. The silanes II are preferably stirred in after the addition of ammonia and removal of the excess organic solvent. The solids content of the novel dispersions is chosen so that a viscosity favorable for processing results, this being advantageous in use and being effected by removal or addition of water. Said solids content is from 35 to 60, preferably from 40 to 55, % by weight. In addition, the viscosity can be modified by the addition of thickeners. Other possible additives are resins or plasticizers, in order to vary the adhesive properties. The novel synthetic resin dispersions generally have a long shelf life, ie. as a rule they do not form two phases or show altered viscosity, film-formation or adhesive behavior on prolonged storage. Their films have an advantageous cohesive and adhesive behavior and are suitable as contact adhesives having high water resistance for self-adhesive articles, for example for the production of self-adhesive tapes and self-adhesive films, in particular of protective films and decorative films. Suitable substrates include paper, plastics films or textiles. The substrate materials can be coated using conventional application units, for example with the aid of a knife-over-roll coater. The applied disperse layer is generally converted into a film by heating.

EXAMPLES

EXAMPLES 1 TO 5

Preparation of various novel synthetic resin dispersions

General method: A solution of 60 g of a monomer mixture A1 in 60 g of isobutanol was heated to the polymerization temperature of 105° C., and 8 g of a solution L of tert-butyl peroctoate in isobutanol were added all at once. Thereafter, a further 25 g of the solution L and the remaining amount of A1 were added continuously via separate feeds in the course of 1.5 hours while maintaining the polymerization temperature, and, after the feed had ended, polymerization was continued for a further hour. A further 80 g of the solution L and a monomer mixture A2 were then added to the reaction mixture at constant polymerization temperature via separate feeds in the course of 3 hours. Thereafter, the remaining amount of the solution L was added continuously in the course of 2 hours, and polymerization was continued for 1.5 hours. 23.6 g of a 25% strength by weight aqueous ammonia solution and 1,000 g of water were stirred into the resulting solution of the polymer in isobutanol at 70° C. The solvent used was then separated off by distillation under reduced pressure to a content of less than 1% by weight, the amount of water simultaneously removed being added again. To prepare the novel dispersion, 3-glycidyloxopropyl-trimethoxysilane was then stirred in as the silane II. The dispersions thus obtained have the properties shown in Table 1. Table 1 also contains the quantitative data relating to the starting materials used for their preparation.

drying oven. Strips 2 cm wide and 5 cm long were cut out from the resulting self-adhesive film.

(b) Testing the cohesion (shear strength)

To test the internal strength of the adhesive film of a novel dispersion, the test strips (a) were rolled over a length of 2.5 cm, using a weight of 2.5 kg, onto a chromium-plated steel sheet (V2A) and stored for 24 hours under standard conditions. The end of the steel sheet which was not adhesively bonded was then fastened between 2 clamping jaws, and the opposite projecting self-adhesive tape, freely suspended, was loaded with a weight of 1 kg at 25° and 50° C. The time taken to break the adhesive film is a measure of the internal strength of the adhesive film.

(c) Initial adhesion (immediate peel strength or initial adhesion)

To determine the initial adhesion of the test strips (a) to the surface of a substrate, said strips were rolled over a length of 2.5 cm, using a weight of 2.5 kg, onto a chromium-plated steel sheet (V2A). Immediately afterward, the force required to peel off the test strips backward in a tensile strength testing apparatus at a peel angle of 180° C. and at a rate of 300 mm/min without breaking the adhesive film was determined.

(d) Water resistance

To determine the water resistance, the novel dispersions were applied to a transparent polyester film in a thickness such that a 20 μm thick dry layer was obtained, and drying was carried out for 3 minutes at 90° C. in a drying oven. Thereafter, the film was clamped in a frame and, in order to determine the light transmittance, was immersed in the water-filled cell of a pho-

TABLE 1

|  | Example 1 | Example 2 | Example 3 | Example 4 | Example 5 |
|---|---|---|---|---|---|
| A1: | | | | | |
| Methyl methacrylate [g] | 48 (16) | 48 (16) | 48 (16) | 48 (16) | 24 (8) |
| n-Butyl acrylate [g] | 227 (75.7) | 227 (75.7) | 227 (75.7) | 227 (75.7) | 251 (83.7) |
| Acrylic acid [g] | 25 (8.3) | 25 (8.3) | 25 (8.3) | 25 (8.3) | 25 (8.3) |
| The () contain the amounts converted to % by weight, based on A1. | | | | | |
| A2: | | | | | |
| Methyl methacrylate [g] | 112 (16) | 112 (16) | 112 (16) | 109.5 (15.6) | 56 (8) |
| n-Butyl acrylate [g] | 583 (83.3) | 583 (83.3) | 583 (83.3) | 583 (83.3) | 639 (91.3) |
| 3-Mercaptopropyltrimethoxysilane [g] | 5 (0.7) | 5 (0.7) | 5 (0.7) | 7.5 (1.1) | 5 (0.7) |
| The () contain the amounts converted to % by weight, based on A2. | | | | | |
| L: | | | | | |
| tert-Butyl peroctoate [g] | 8 | 8 | 8 | 8 | 7 |
| Isobutanol [g] | 192 | 192 | 192 | 192 | 192 |
| Silane II: 3-Glycidyloxypropyltrimethoxysilane [% by weight based on synthetic resin A] | 0.1 | 0.3 | 0.5 | 1 | 0.5 |
| Dispersion: | | | | | |
| Solids content [% by wt.] | 50.3 | 50.3 | 50.3 | 48.3 | 43.4 |
| Isobutanol content [% by weight] | 0.53 | 0.53 | 0.53 | 0.45 | 0.71 |
| pH | 7.8 | 7.8 | 7.8 | 8.0 | 8.2 |

EXAMPLE 6

Testing the contact adhesive properties of films of synthetic resin dispersions from Examples 1 to 5

(a) Production of test strips

To produce test strips, the dispersions were applied to a polyester film as the substrate in an amount such that the thickness of the dry layer corresponded to 25 g/m², and drying was carried out for 3 minutes at 90° C. in a tometer at 20° C. Immediately after immersion, the light transmittance was calibrated at 100% and the decrease in light transmittance as a function of time was then recorded. The films of the novel dispersions showed a decease of from 2 to 10% after 30 min, while the films of dispersions containing hydrophilic assistant systems show a decrease of not less than 25% in the same period.

The test values of tests (b) to (d) are shown in Table 2.

TABLE 2

| | Dispersion from Example | | | | |
|---|---|---|---|---|---|
| | 1 | 2 | 3 | 4 | 5 |
| Cohesion (hours), 25° C. | 19.5 | 74 | 64.5 | >120 | 3.13 |
| Cohesion (hours), 50° C. | 1.9 | 6.0 | 4.9 | 10.0 | 0.4 |
| Immediate peel strength (N) | 8.0 | 6.2 | 5.7 | 3.8 | 1.7 |
| Light transmittance after 30 min (%) | 96 | 97 | 98 | 91 | 95 |

We claim:

1. An aqueous synthetic resin dispersion consisting of:
(A) from 35 to 60% by weight of a synthetic resin obtained by free radical solution polymerization of a monomer mixture A1 and a monomer mixture A2 in an organic solvent separately polymerized and then combined or in succession spatially at the same point in an amount from 15 to 70 parts by weight of mixture A1 and from 30 to 85 parts by weight of mixture A2, wherein mixture A1 is:
(a) from 1.5 to 15% by weight of at least one monomer selected from the group consisting of $\alpha,\beta$-monoethylenically unsaturated monocarboxylic acids of 3 to 5 carbon atoms, monoethylenically unsaturated dicarboxylic acids selected from the group consisting of maleic and itaconic acids, anhydrides and half-esters of these dicarboxylic acids with alkanols of 1 to 8 carbon atoms or with glycol monoethers (monomers I),
(b) from 65 to 98.5% by weight of at least one monomer selected from the group consisting of $C_{1-10}$ alkyl (meth)acrylates (monomers II),
(c) from 0 to 10% by weight of at least one monomer selected from the group consisting of $C_{11-20}$ alkyl (meth)acrylates (monomers III),
(d) from 0 to 20% by weight of at least one vinyl aromatic monomer (monomers IV),
(e) from 0 to 5% by weight of at least one mercaptosilane of formula I (compound V)

$$HS-\left(\begin{array}{c}R^1\\|\\C\\|\\R^2\end{array}\right)_n\begin{array}{c}R^3\\|\\Si-R^4\\|\\R^5\end{array} \quad I$$

where n is from 1 to 8, $R^1$ and $R^2$ independently of one another are each hydrogen or $C_1$–$C_4$-alkyl and $R^3$, $R^4$, and $R^5$ independently of one another are each $C_1$–$C_6$-alkyl or $C_1$–$C_6$-alkoxy, with the proviso that one or more of the radicals $R^3$ to $R^5$ is alkoxy, and
(f) from 0 to 10% by weight of at least one other copolymerizable monomer (monomers VI), and mixture A2 is:
(a) from 60 to 100% by weight of at least one monomer II,
(b) from 0 to 10% by weight of at least one monomer III,
(c) from 0 to 30% by weight of at least one monomer IV and VI and
(d) from 0 to 5% by weight of at least one compound V, with the proviso that more than 65% by weight of the sum total of A1 and A2 is accounted for by monomers II whose homopolymers have a glass transition temperature of from 0° to −70° C., and an amount of compound V which differs from 0 and compound V is incorporated as polymerized in the copolymer;
(B) from 0.05 to 5% by weight, based on said synthetic resin, of at least one silane of the formula II $$\begin{array}{c}R^3\\|\\R^6-Si-R^4\\|\\R^5\end{array} \quad II$$

wherein $R^6$ is an epoxy-carrying radical and $R^3$–$R^5$ are as defined above,
(C) an amount of at least one compound selected from the group consisting of ammonia and organic amine such that the pH of the aqueous dispersion ranges from 6 to 10;
the remainder of the composition being water, with the dispersion containing from 0 to 5% of organic solvent.

2. The aqueous synthetic resin dispersion of claim 1, wherein said copolymerizable monomer (VI) is a member selected from the group consisting of lower alkyl vinyl ethers vinyl esters of lower alkane carboxylic acids, diesters of maleic, fumaric, itaconic, citraconic or mesaconic acid with monohydric alcohols of 1 to 20 carbon atoms which may contain ether and/or thioether groups, monoesters of acrylic or methacrylic acid with alkanediols, acrylamide, methacrylamide, acrylonitrile, methacrylonitrile, monoolefins of 3 to 20 carbon atoms and diolefins.

3. A method of preparing a self adhesive article, comprising:
providing an article with a coating of the synthetic resin dispersion of claim 1 thereby forming said self adhesive article having a contact adhesive coating.

* * * * *